(12) United States Patent
Reber (10) Patent No.: US 7,739,068 B2
(45) Date of Patent: Jun. 15, 2010

(54) METHOD OF PROCESSING THE OUTPUT SIGNAL OF A MEASURING TRANSDUCER, AND FORCE-MEASURING DEVICE

(75) Inventor: Daniel Reber, Madetswil (CH)

(73) Assignee: Mettler-Toledo AG, Greifensee (CH)

( * ) Notice: Subject to any disclaimer, the term of this patent is extended or adjusted under 35 U.S.C. 154(b) by 1029 days.

(21) Appl. No.: 11/471,612

(22) Filed: Jun. 21, 2006

(65) Prior Publication Data

US 2007/0007046 A1 Jan. 11, 2007

(30) Foreign Application Priority Data

Jun. 21, 2005 (EP) .................................. 05105424

(51) Int. Cl.
*G01L 1/00* (2006.01)
(52) U.S. Cl. .................... 702/101; 177/185; 708/300
(58) Field of Classification Search ............ 177/185; 702/101, 102, 104; 708/300
See application file for complete search history.

(56) References Cited

U.S. PATENT DOCUMENTS

| 4,705,126 A | | 11/1987 | Naito |
| 4,817,026 A | * | 3/1989 | Inoue et al. .................. 708/300 |
| 4,860,839 A | | 8/1989 | Reichmuth |
| 5,130,938 A | * | 7/1992 | Inoue ......................... 702/194 |
| 5,178,228 A | * | 1/1993 | Feinland et al. ............. 177/185 |

(Continued)

FOREIGN PATENT DOCUMENTS

| CH | 673 529 A5 | 3/1990 |
| DE | 100 24 986 A1 | 11/2001 |
| EP | 0 757 429 A1 | 2/1997 |
| EP | 0 945 717 A1 | 9/1999 |
| WO | 03/015269 A2 | 2/2003 |

OTHER PUBLICATIONS

"Finite Impulse Response FAQ: Basics", Iowegian International Corp. (www.dspguru.com/info/faqs/firfaq.htm) © 2004.*

(Continued)

*Primary Examiner*—Randy W Gibson
(74) *Attorney, Agent, or Firm*—Buchanan Ingersoll & Rooney PC (57) ABSTRACT

A method serves to process output signal of a measuring transducer in a force-measuring device, in particular in a balance, wherein the measuring transducer produces a measuring signal representative of a load acting on the device and the measuring signal is filtered in a variable analog filter and/or, after processing in an analog/digital converter, the measuring signal is filtered in a variable digital filter, in order to remove unwanted signal components that are caused by disturbances affecting the force-measuring device, in particular by changes in the weighing load. The measuring signal is monitored in regard to the occurrence of a change in the weighing load and after a load change has been detected, at least one filter parameter of the filter is reset and then varied as a function of time in accordance with a prescribed time profile $f_c(t)$, so that the filter is opened after a load change has been detected and then closed again to the point where a predefined filter characteristic has been attained which is determined by the end value of the at least one filter parameter. By using this method, it is possible with simple measures to realize noticeably shortened transient settling times of the force-measuring device after a load change has occurred.

19 Claims, 6 Drawing Sheets

U.S. PATENT DOCUMENTS

| | | | |
|---|---|---|---|
| 5,190,115 | A | 3/1993 | Dolan et al. |
| 5,226,496 | A * | 7/1993 | Feinland et al. .......... 177/25.15 |
| 5,337,264 | A | 8/1994 | Levien |
| 5,548,543 | A | 8/1996 | Wang |
| 5,665,941 | A | 9/1997 | Wehhofer et al. |
| 6,271,484 | B1 | 8/2001 | Tokutsu |
| 6,409,845 | B1 | 6/2002 | Tellenbach |
| 6,657,138 | B2 | 12/2003 | Klauer et al. |
| 6,713,689 | B2 * | 3/2004 | Eaton et al. .............. 177/25.15 |
| 6,774,319 | B2 * | 8/2004 | Aoki et al. ................. 177/144 |
| 7,129,424 | B2 * | 10/2006 | Vilhjalmsson et al. ... 177/25.13 |
| 2001/0052431 | A1 | 12/2001 | Klauer et al. |
| 2004/0088342 | A1 | 5/2004 | Aikawa et al. |
| 2004/0153780 | A1 * | 8/2004 | Strohrmann et al. .......... 714/25 |
| 2005/0023046 | A1 | 2/2005 | Vilhjalmsson et al. |
| 2008/0133625 | A1 * | 6/2008 | Alexandru .................. 708/101 |
| 2009/0125575 | A1 * | 5/2009 | Aikawa et al. .............. 708/300 |

OTHER PUBLICATIONS

"Finite Impulse Response FAQ: Properties", Iowegian International Corp. (www.dspguru.com/info/faqs/firfaq.htm) © 2004.*

"Infinite Impulse Response FAQ: Basics," Iowegian International Corp. (www.dspguru.com/info/faqs/iirfaq2.htm) © 2009.*

European Search Report (with English translation of category of cited documents) dated Nov. 7, 2005.

Mettler Toledo GmbH, Build Your Quality on Solid Ground, Jan. 2001, pp. 14-15.

Mettler Toledo GmbH, Weighing Primer, Apr. 2001.

U. Tietze, Ch. Schenk, Semiconductor Circuit Design, $11^{th}$ edition, $1^{st}$ reprint, Springer Verlag, Berlin 1999.

* cited by examiner

METHOD OF PROCESSING THE OUTPUT SIGNAL OF A MEASURING TRANSDUCER, AND FORCE-MEASURING DEVICE

RELATED APPLICATIONS

The present application claims priority under 35 U.S.C. §119 to European Application No. 05105424.5 filed Jun. 21, 2005, the contents of which are hereby incorporated by reference in their entirety.

BACKGROUND

A method of processing the output signal of a measuring transducer is disclosed. A force-measuring device, in particular a balance, which is equipped with a measuring transducer whose output signal is being processed according to the method of processing the output signal of a measuring transducer.

The measuring accuracy of a force-measuring device, for example a balance based on the principle of electromagnetic force compensation or strain gauge technology (see reference [1], "Bauen Sie Ihre Qualität auf solidem Grund!" (*Build your Quality on Solid Ground*!), company publication, Mettler Toledo GmbH, January 2001, pages 14-15) is determined by numerous influence factors which are described in [2], "Wägefibel" (*Weighing Primer*), Mettler Toledo GmbH, April 2001. Particularly undesirable are disturbances caused by mechanical factors such as vibrations or shocks, which is the reason why already balances using analog signal processing were equipped with filters serving to remove disturbances in the signal.

Reference [3], CH 673 529 A5 discloses a balance with an active low-pass filter which is designed to suppress signal disturbances in the form of unwanted AC components that are superimposed on the DC signal produced by the weighing cell and sent through a signal line to an analog/digital converter. The unwanted signal components are tapped off the signal line at the signal output terminal of the weighing cell, their phase is changed by 180° by an inverter, and the inverted AC disturbance component is fed back into the signal lead at the input terminal of the analog/digital converter, wherein the signal lead itself has an ohmic resistance between the aforementioned tap-off node and feed-back node. Consequently, the disturbing signal components are canceled by matching signal components of opposite phase.

Reference [4], DE 10024986 A1, describes an electronic weighing transducer with a digital signal-processing unit in which a DC component in the output signal of the weighing transducer is determined by means of a filter with a low-pass characteristic, and the weighing result is determined from the filtered DC component. At the same time, a shock- and vibration-dependent signal is determined and dependent on the latter the DC component of the measuring signal is altered.

According to reference [4], the foregoing concept avoids drawbacks that occur with the solution disclosed in [5], U.S. Pat. No. 5,665,941. According to [5], the time constant of the low-pass filter in a differential dosage-dispensing balance is changed dependent on the disturbance component in the signal. In this arrangement, the time constant of the low-pass filter is lengthened in the case of large disturbances in order to achieve a stronger filtering effect. However, as stated in [4], the concept described in reference [5] causes the weighing transducer to react sluggishly to changes while increasing the reproducibility of the measurements only to an insignificant extent. If the time constant is selected too large, this will further result in a long settling time for transient oscillations that accompany changes in the weighing load.

Further methods as well as balances in which said methods can be used are described in references [6], US 2004/0088342 A1, and [7], U.S. Pat. No. 6,271,484 B1, wherein the signals produced by the measuring transducer are processed by means of variable digital filters.

With the method described in [6] the characteristic of the filter being used can be adapted individually to the oscillatory properties of the measuring system that is being controlled by the method. The damping of the filter can therefore be increased to any desired degree within a selected frequency range.

According to the method described in [7], a test is made to determine whether the amplitude of the vibration-related signal disturbances lie within a permissible range. If this is not the case, the filter characteristic is changed until the signal disturbances are within the permissible range again.

In particular the last-described method requires a high amount of computing power and, due to the time constant of the servo loop, hardly allows a fast enough adaptation to rapid amplitude changes of vibrations and oscillations as soon as they occur.

The oscillations of rapidly changing amplitude which occur with changes of the weighing load are, however, corrected only to an insufficient extent with the existing solutions, some of which are very complex and expensive, if there is a simultaneous requirement to realize a short settling time for transient oscillations after a change in the weighing load. Because in the previously practiced solutions, the aim was in most cases to achieve a compromise between the strongest damping of oscillatory disturbances combined with the longest response time on the one hand and the weakest damping of oscillatory disturbances combined with the shortest response time on the other hand, none of the results achieved so far in regard to response time as well as in regard to the filtering of disturbances in the signal have been good enough to meet the most stringent requirements.

The disclosures of references [1] to [8] are hereby incorporated by reference herein in their entireties.

SUMMARY

A method for processing of the output signal of a measuring transducer is disclosed. The method can be used for operating a force-measuring device.

Various exemplary methods, through simple measures, make it possible to obtain an optimal degree of filtering of the output signal of the measuring transducer and simultaneously a minimal settling time of transient oscillations of the force-measuring device.

For example, the filter parameters of the one or more filters that are being used can be optimized in regard to the transient oscillations that occur with changes of the weighing load as well as in regard to signal disturbances other than those associated with load changes.

An exemplary force-measuring device distinguished from the state of the art by the simplicity of its design as well as by the simplicity of adjusting its parameter settings is disclosed.

One exemplary method serves to process the output signal of a measuring transducer in a force-measuring device, in particular in a balance, wherein the measuring transducer produces a measuring signal representative of a load acting on the device. The signal is filtered in a variable analog filter and/or—after processing in an analog/digital converter—in a variable digital filter, in order to remove unwanted signal components that are caused by disturbances, in particular by changes in the weighing load.

According to the exemplary method, the measuring signal is monitored in regard to the occurrence of a change in the weighing load. After a load change has been detected, at least one filter parameter of the filter is reset and then varied as a function of time in accordance with a prescribed profile, preferably in accordance with an exponential function. Thus, when a load change has been detected, the filter is first opened and then closed again to the point where a predefined filter characteristic has been attained which is determined by the end value of the at least one filter parameter.

By setting the filter to, for example, a completely open condition (transfer function $G(z)=1$) after detecting a load change, the changes in the weighing load can be followed rapidly. With the filter being subsequently closed until a predetermined filter characteristic has been attained, a practically optimal suppression of signal disturbances is accomplished, in particular oscillations caused by load changes. Overall, the settling times of transient oscillations after a load change are therefore strongly shortened. With a suitable choice of the end values of the filter parameters, one ensures in addition that the measuring signal is optimally filtered also after the transient settling phase of the measuring system. Thus, by using the disclosed method, one achieves as a result the shortest settling times for transient oscillations and at the same time an optimal damping of signal disturbances without having to accept any compromises. Exemplary embodiments can therefore be used advantageously in dosage-dispensing balances and check-weighing balances where a rapid response to load changes and a short settling phase are desired, while it can also be used with advantage in high-precision balances.

Although such an exemplary method can also be used in analog signal-processing stages, it will find application in the area of digital signal-processing. Digital filters are described in [8], U. Tietze, Ch. Schenk, "Halbleiterschaltungstechnik" (*Semiconductor Circuit Design*), $11^{th}$ edition, $1^{st}$ reprint, Springer Verlag, Berlin 1999, Chapter 21. Regarding an exemplary practice for realizing IIR filters by means of a signal processor, see reference [8], chapter 21.7.2, pages 1181-1184. All of reference [1] to [8] are incorporated by reference herein in their entireties.

The exponential time profile of the closure function that is used after a load change has been detected and the filter parameter has been reset is normally specified by the manufacturer of the force-measuring device, but it can also be continuously optimized by means of an optimizing procedure after the force-measuring device has been put into service.

The closure function is derived, for example, preferably from the transient settling time of the filter, the noise level to be expected at the input side of the filter as well as the resolution of the force-measuring device.

Thus, the closure function is not dependent on the disturbances which actually take place after a load change has occurred, but depends on the anticipated time profile of the disturbances. However, since the actually occurring transient oscillations regularly settle down exponentially, the anticipated profile of the disturbances and thus the selected closure function will be in optimal agreement with the actual situation.

With the closure function the filter is adapted in a practically optimal way to the nature of the transient oscillations, and computing activities which would otherwise be required become largely unnecessary.

Such an exemplary solution is therefore fundamentally different from solutions in which the closure functions are set primarily dependent on actually occurring disturbances, where for example the magnitude of the disturbances is measured (see [7]) or the frequency ranges of the disturbances are determined for example by means of FFT (fast Fourier transforms) and the filter parameters are optimized. This optimization is not required in order to achieve good measuring results with the disclosed method, but it can be used as an added feature in exemplary embodiments. In this case, a closure function or the end values of the filter parameters r which are already providing good results can be further optimized. For example, the zero of an FIR filter can also be set to a frequency at which disturbances were found.

The digital filter can be a recursive or non-recursive n-th order filter which is arranged in a filter stage, such as an IIR filter (for example of $8^{th}$ order) or an FIR filter which has a detector module individually assigned to it which serves to detect changes in the weighing load, as well as a generator module that serves to generate values for the filter parameter that correspond to the profile of the closure function.

In reference [8], chapter 21.8, pages 1184 and 1185, a comparison is presented between FIR- and IIR filters. As can be seen in FIG. 21.53, an FIR filter needs to be of an order that is more than twice as high as would be required in an IIR filter. In an exemplary embodiment, at least one n-th order IIR filter is used. However, one should keep in mind that the calculation of the filter parameters for a higher-order filter can pose a relatively demanding task.

For this reason, in one exemplary embodiment, a plurality of discrete filter stages are used, each of which has a first-order filter, wherein the filters have, for example, a logarithmic distribution of bandwidths and are connected in a single series in such a way that the measuring signal is processed sequentially in all filter stages, and when a change of the weighing load is detected in one of the filter stages, this is signaled to the other filter stages. Each of the filter stages is therefore provided with an appropriately adapted closure function and an individual end value of the filter parameter.

As a result of this measure, there are significantly fewer filter parameters which furthermore are easier to calculate and to change.

When a change in the weighing load has been detected, the input- and output terminals of the filter stages which serve for the entry and exit of the measuring signal are preferably connected to each other for at least one measurement period, so that the measuring signal can pass through the filter stages without being processed and the display can rapidly follow the load change. The load changes are detected early and reliably.

In one exemplary embodiment, the measuring signal or its time derivative in the detector module is directed, for example, by way of a delimiter module to a first integrator module and by way of an inverter module to a second integrator module, whereupon the resultant signals at the output sides of the integrator modules are compared to a threshold value in a comparator module. After the threshold value has been exceeded, the generator module, for example, also the detector module are reset. In this arrangement, the first integrator module serves to detect increases of the load, while the second integrator module serves to detect reductions of the load.

Entering the time derivative of the measuring signal and a drift compensation signal into the integrator modules has the effect that the output signals of the integrator modules change only in those cases when there is also a change of the weighing load.

Resetting the generator module causes the change of the filter parameter that was described above. The resetting of the detector module creates the conditions required so that with the changed load as the new point of departure the integrator modules can register the further load changes correctly.

It is further possible to detect a change in the weighing load by comparing the interval between zero crossings of the time derivative of the measuring signal to a threshold value, because a load change manifests itself in the derivative of the signal as a half-wave with two zero crossings whose distance from each other is dependent on the magnitude of the load change. However, if between the two zero crossings there are further zero crossings due to disturbances, this solution entails the risk that the load change is not recognized.

In another exemplary embodiment, the aforementioned optimization of the force-measuring device can be achieved by stepwise changes of the closure function and/or of the end value of the filter parameters and by determining the resultant effect of the changes based on at least one stored signal profile, whereupon that closure-function profile and signal-parameter end value for which, respectively, the shortest oscillation-settling time was found after a load change and the lowest noise level was found after the transient settling phase of the force-measuring device are kept for the subsequent signal-processing. It needs to be noted again here that with the disclosed method and due to the simple design of the filter structure with the reduced number of filter parameters, the optimization of the force-measuring device can also be performed easier and faster.

In addition to the variable filters, one can further use fixed filters by means of which a desired minimal filtering of the measuring signals takes place in the case where the transfer functions of the variable n-th order filter or of the cascaded lower-order variable filters are reset. As already mentioned, the cascaded variable filters can further include recursive and/or non-recursive filters. It is of particular advantage to use a filter cascade with recursive filters that is followed in series by at least one non-recursive filter which serves to reduce the recursive signal portions and thus to stabilize the output signals of the filter cascade.

BRIEF DESCRIPTION OF THE DRAWINGS

Details of the exemplary methods of processing the output signal of a measuring transducer and exemplary force-measuring devices are set forth in the description of the embodiments in conjunction with the drawings, wherein.

DETAILED DESCRIPTION

Figures 1, 2:
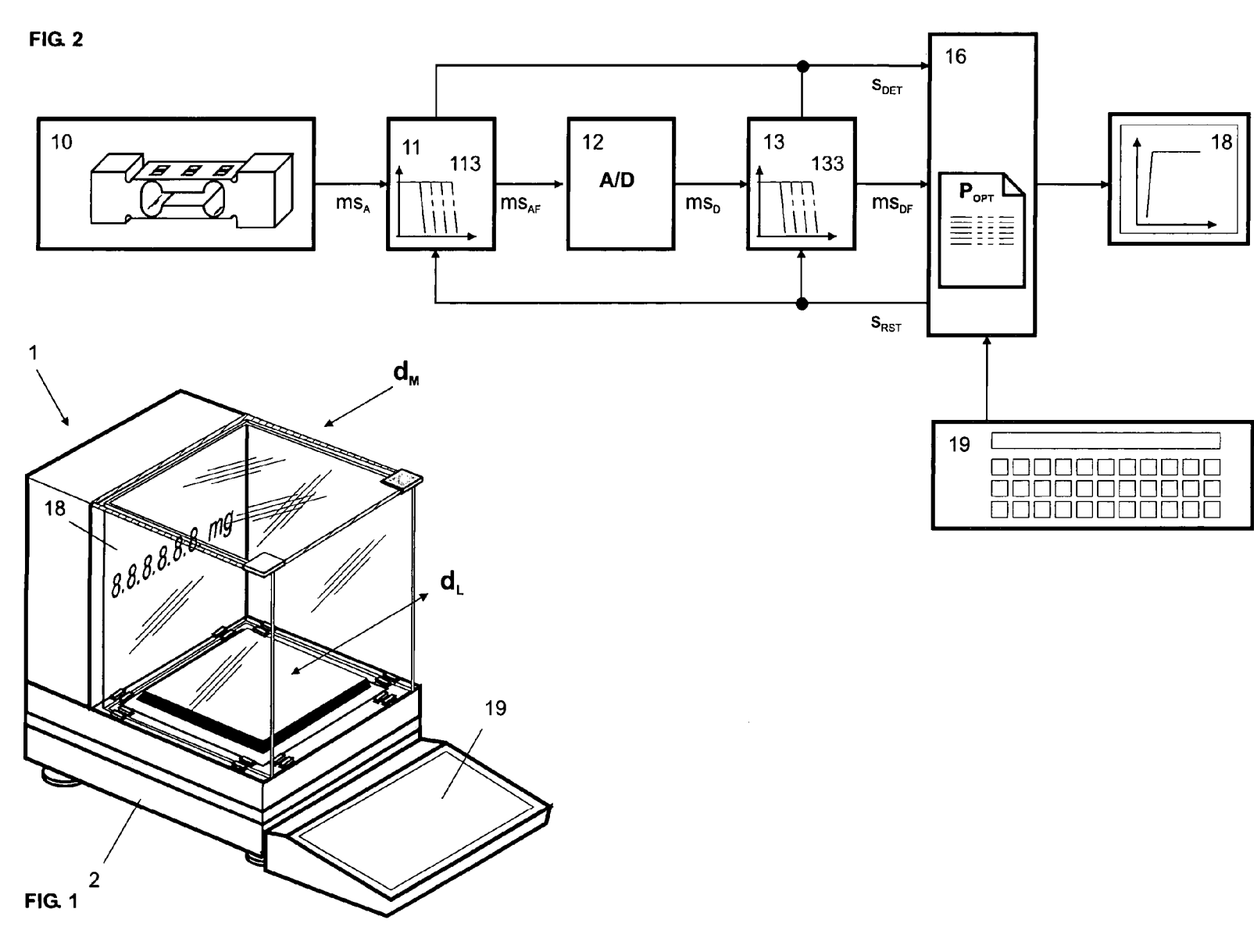
FIG. 1 illustrates an exemplary balance 1 with symbolically indicated influence factors $d_M$ and $d_L$ which can cause a disturbance in the time profile of the measuring signal.
FIG. 2 shows a block diagram for an exemplary balance with a measuring transducer 10 which by way of an analog signal-processing unit 11 and an analog/digital converter 12 is connected to a digital signal-processing unit 13, from which the processed signals are delivered to a processor 16 which passes the signals on to an output unit 18.

FIG. 1 illustrates an exemplary balance 1 according to an exemplary embodiment with symbolically indicated extraneous influence factors $d_M$ and $d_L$ which have a significant influence on the time profile of the measuring signal ms. The time profile of the signal varies on the one hand as a function of changes in the weighing load $d_L$. The signal profile further varies dependent on mechanical influence factors $d_M$ such as vibrations and shocks whereby parts of the balance, in particular the measuring transducer or its parts, are caused to oscillate. Even after a change $d_L$ of the load acting on the balance has already taken place, a mechanical disturbance results each time in transient oscillations that superimpose themselves on the usable signal. The signal-processing unit in the balance 1 therefore has the task of separating that part of the signal that represents the weighing load in the best and fastest way possible from unwanted parts of the signal that are caused by vibrations, shocks and load changes. This can be of particular importance in balances in which load changes follow each other in short time intervals. Particularly in balances with a high measuring resolution, it can be further desired that the noise is also reduced sufficiently well after the decay of the transient oscillations.

FIG. 2 shows as an example the block diagram of the balance of FIG. 1 with a measuring transducer 10 which sends an analog measuring signal $ms_A$ representing the weighing load to an analog/digital converter 12 by way of a first signal-processing unit 11 serving to process analog signals (filtered signal indicated in the drawing as $ms_{AF}$). The analog/digital converter 12 directs the digitized measuring signal $ms_D$ to a second signal-processing unit 13 serving to process digital signals. From the second signal-processing unit 13, the filtered digital measuring signal $ms_{DF}$ is sent to a processor 16 which is connected to a keyboard 19 and an indicator 18, for example a liquid crystal display, on which the measuring results are displayed.

The signal-processing units 11, 13 send detection signals $s_{DET}$ serving to announce load changes through a first control line to the processor 16 which after receiving a detection signal $s_{DET}$ returns a reset signal $s_{RST}$ to the signal-processing units 11, 13 whereby the filters 113, 133 in the signal-processing units are opened and then closed again according to the time profile of at least one closure function $f_c(t)$.

The measure of putting the filter into a completely open state after a load change has been detected allows load changes to be followed with a rapid response. By subsequently closing the filter 113, 133 to the point where an intended filter characteristic is obtained, for example a low-pass characteristic of small bandwidth, an optimal suppression is achieved for signal disturbances, in particular oscillations caused by the load change as well as signal disturbances occurring at a later time.

Figure 3:
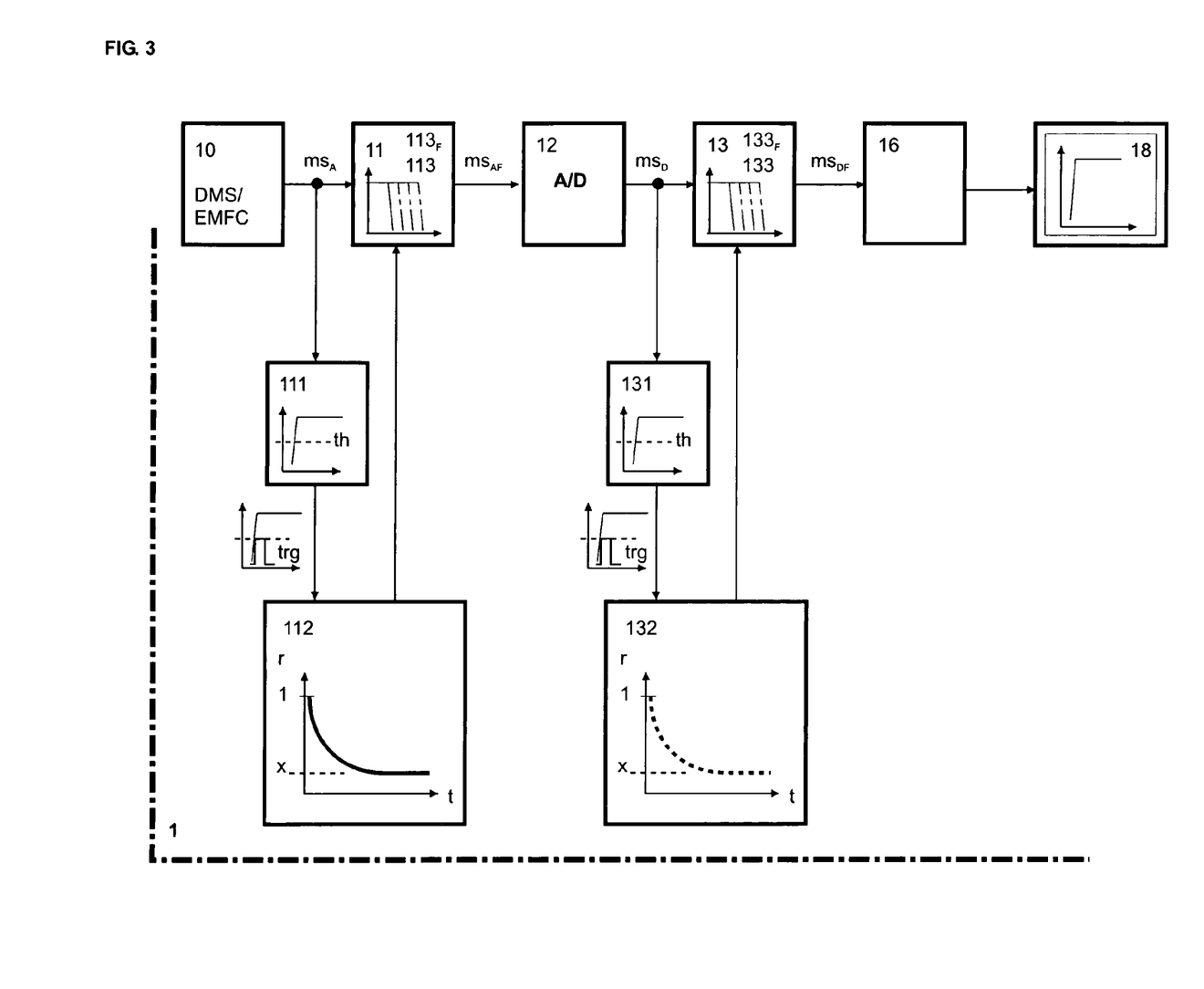
FIG. 3 shows the block diagram of FIG. 2, supplemented by detector modules 111, 131 by means of which changes in the weighing load can be detected and generator modules 112, 132 can be controlled which provide the capability to change the properties of the filters 113, 133 in the analog and digital signal-processing units 11, 13 in accordance with the profile of a closure function after a load change has been detected.

FIG. 3 shows the block diagram of FIG. 2 in a more general form wherein it remains undefined which modules (processor, signal processors, discrete circuits or software modules) provide the functions and the computing power to carry out the disclosed method. In this circuit arrangement, the analog measuring signal $ms_A$ that is present at the input side of the analog signal-processing unit 11 and the digital measuring signal $ms_D$ that is present at the input side of the digital signal-processing unit 13 are directed, respectively, to detector modules 111 and 131 where the respective incoming signals $ms_A$ and $ms_D$ are compared to a threshold value th, and if the signal is found to exceed the threshold, a generator module 112 or 132, respectively, is triggered (as indicated by the trigger signal trg), whereby the at least one filter parameter r of the respective filter 113, 133 is reset and subsequently varied and returned to a given end value along a time profile in accordance with the given closure function $f_c(t)$.

Thus, with the circuit arrangement of FIG. 3 it is possible to control analog and/or digital filters 113, 133 in accordance with exemplary embodiments. In the analog signal-processing unit 11, active filters 113 can be used with adjustable filter parameters of the kind described in reference [8], chapter 13, on pages 888 to 893. The electronic control of the filter parameters is described on page 891.

In the digital signal-processing unit 13, digital filters 133 with adjustable filter parameters are used as described in reference [8], chapter 21. Of course, the control of the filter parameters is easier to realize with this solution, for example through stepwise changes of the filter parameter in a register of the signal processor that is being used.

According to reference [8], page 1133, there is a growing trend away from analog signal processing towards digital signal processing. The advantages according to reference [8] are seen in the higher degree of accuracy and reproducibility as well as in the lower sensitivity to disturbances. For the method presented herein, the simple and precise way in which the digital filters can be controlled is of particular importance.

In the following, exemplary embodiments are described based on the use of digital filters.

The design structure, function and properties of digital filters are described in reference [8], chapter 21. Electronic balances with digital filters are disclosed for example in references [6] and [7]. The ways in which digital filters are realized by means of a signal processor is described in reference [8], chapter 21.7.2, on pages 1181 to 1184.

If a signal processor is used, it constitutes essentially by itself the digital signal-processing unit 13. The aforementioned modules, the detector module 131, the generator module 132 and the filter 133 by which a filter stage 130 is formed are therefore based on implemented software modules.

As shown in reference [8], pages 1157 and 1158, an improved approximation of a desired frequency response is possible with higher-order filters. In balances, too, higher-order filters can be used. As an example, an eighth-order filter 133 is used in the block diagram of FIG. 3, wherein the filter parameters r1, . . . , rx of the generator module 132 can be varied in such a way that after a load change has been detected, the frequency response of the filter 133 is optimally adapted to the oscillations that occur.

This has the advantageous result that the filter 133 can be controlled with only one detector module 131 and only one generator module 132. However, the determination of the filter parameters r1, . . . , rx and the determination of the individual closure function profiles $f_{c1}(t)$ to $f_{cx}(t)$ as well as their implementation present a highly demanding task.

In other embodiments, the higher-order filter is therefore replaced by cascaded partial filters of lower order, such as first-order filters, each of which has a detector module 131 and a generator module 132 assigned to it. The cascading of partial filters by which a filter of n-th order can be formed is described in reference [8] on pages 1146 to 1147 and 1174.

Figure 4:
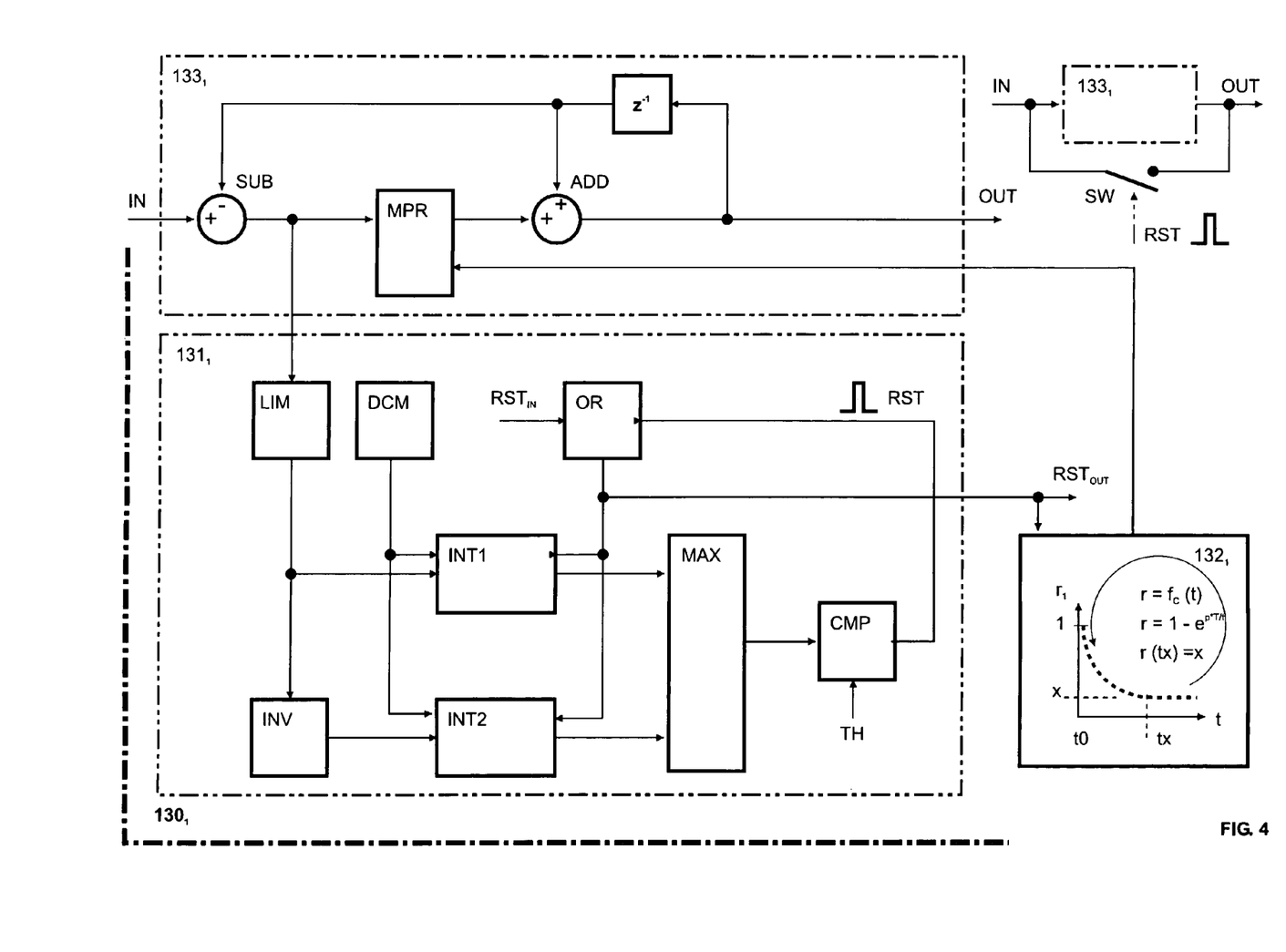
FIG. 4 illustrates an exemplary filter stage 130 with a first-order IIF filter that can be controlled in accordance with the exemplary embodiments by means of a detector module 131 and a generator module 132 when load changes occur.
Figure 5:
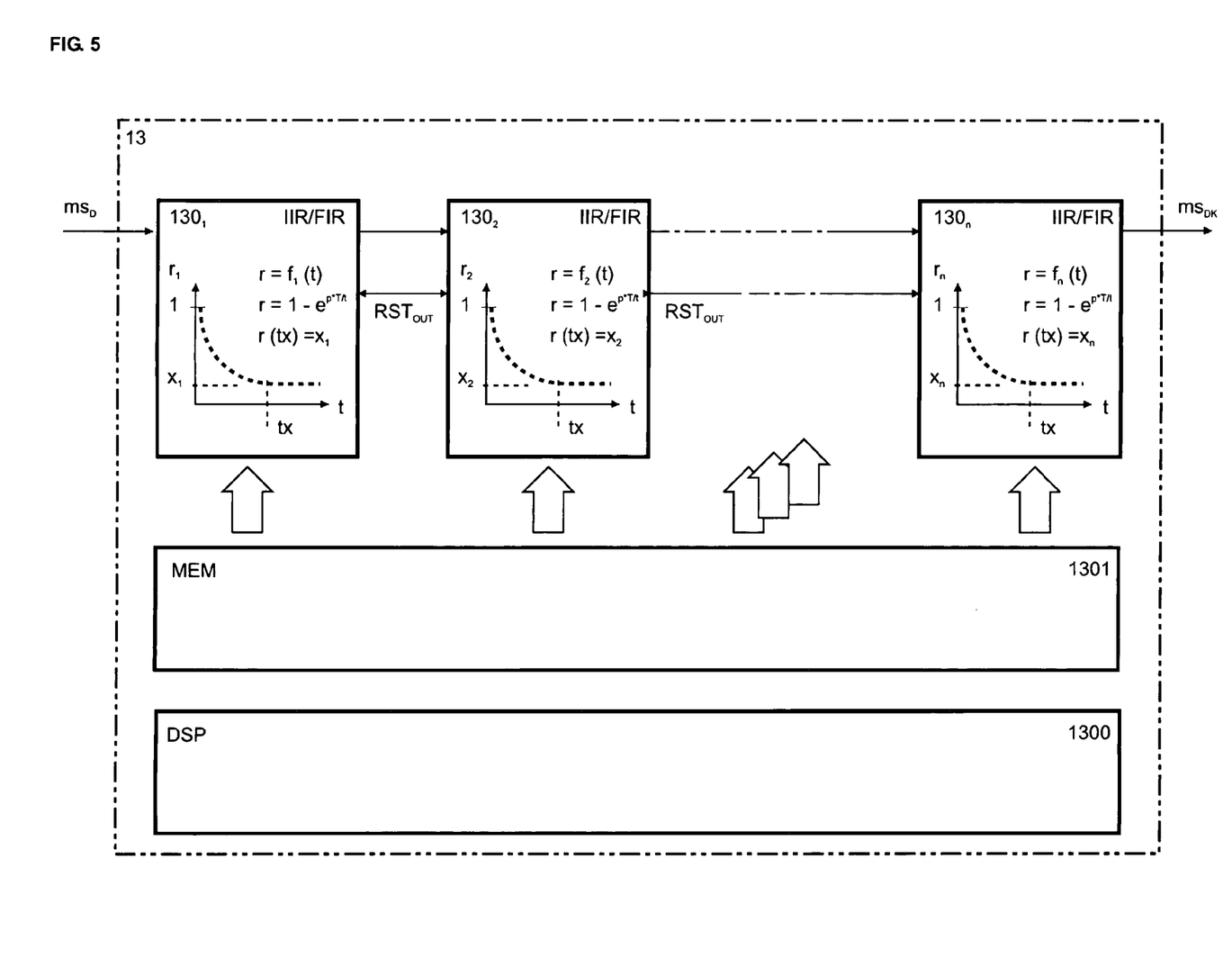
FIG. 5 shows an exemplary digital signal-processing unit 13 according to an exemplary embodiment with n filter stages $130_1, \ldots, 130_n$ of the type according to FIG. 4.
Figure 6:
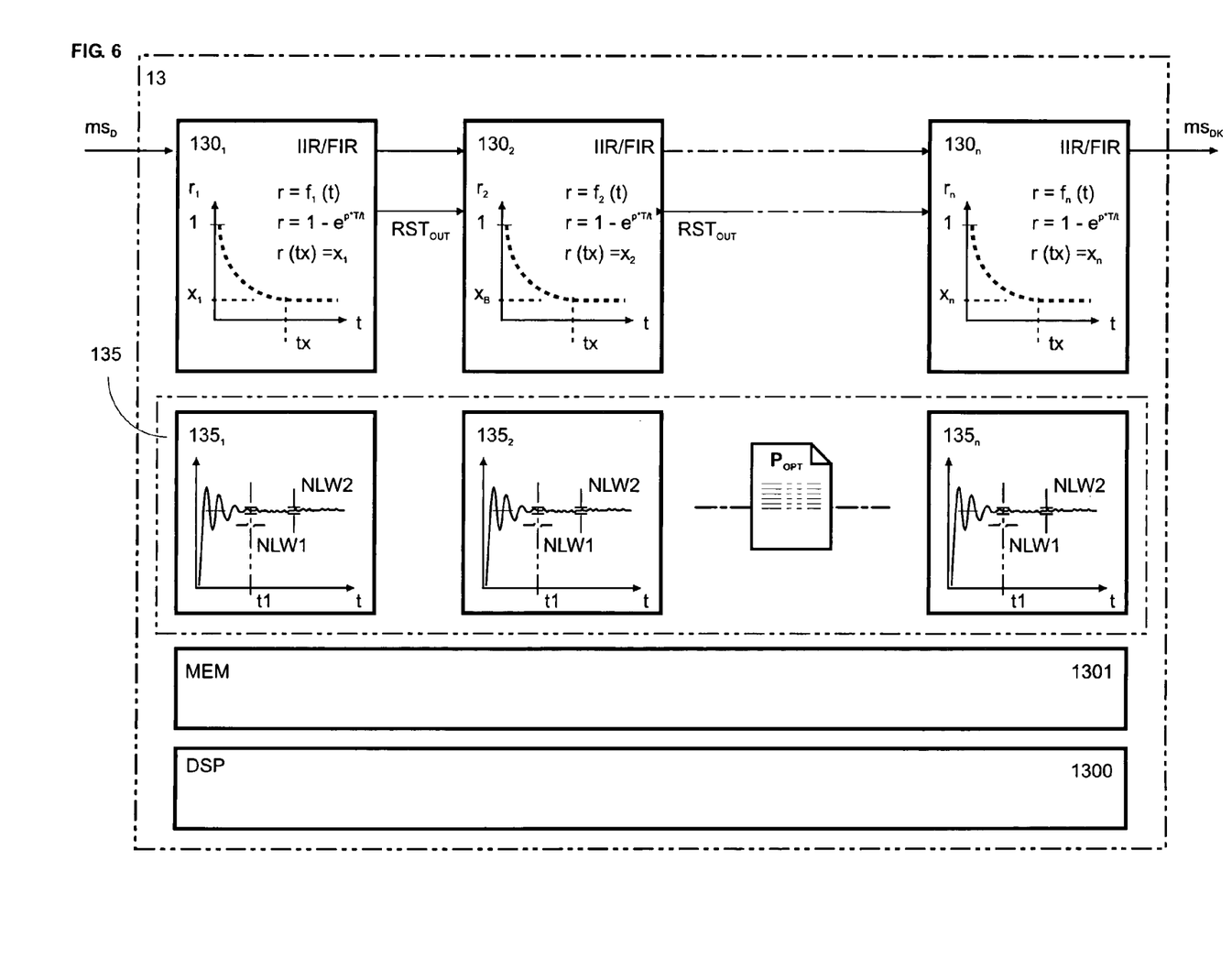
FIG. 6 illustrates the signal-processing unit 13 of FIG. 5 with the addition of an optimization module 135 through which the filter parameters of the filter stages $130_1, \ldots, 130_n$ can be optimized.

FIG. 4 shows a first-order digital filter $133_1$ with a subtractor stage SUB, an adder stage ADD and a multiplier stage MPR, wherein the filter $133_1$ together with a generator module $132_1$ forms a filter stage $130_1$ which, as shown in FIGS. 5 and 6, is part of a cascade of filter stages $130_1, \ldots, 130_n$ forming an n-th order filter that is controlled.

The function of the digital filter $133_1$ is known from reference [8], chapter 21. It should be noted that the filter parameter r which is provided in the multiplier stage MPR and defines the transfer function G(z) of the filter $133_1$ as $$G(z)=r \times z/(z-(1-r))$$

is given by the generator module $132_1$.

In the case where the filter parameter r is reset to a value of 1, the transfer function G(z) will likewise become equal to 1, and the filter $133_1$ will allow the input signal to pass through without being filtered.

At the output side of the subtractor stage SUB the first time derivative of the measuring signal is present, which is directed to the detector module $131_1$. Thus, the output signal of the subtractor stage SUB indicates the rate of change occurring in the input signal of the filter stage $130_1$. In order to determine whether the changes are the result of a load change, the output signal of the subtractor stage SUB is directed to a first integrator module INT1 by way of a delimiter module LIM which can be provided, and to a second integrator module INT2 by way of an inverter INV. The larger of the respective output signals of the two integrator modules INT1, INT2 is selected by a module MAX and directed to a comparator CMP, which compares said signal to a threshold value TH and issues a trigger signal RST if the threshold has been exceeded.

The trigger signal RST activates the generator module $132_1$ which follows in series, so that the generator module sets the filter parameter r for the time t=0 at least approximately to the value of 1 and subsequently varies the filter parameter in accordance with the given closure function $f_c(t)$ until the filter parameter r at the time t=tx assumes the end value x and is kept at this value until the next trigger signal RST arrives. Furthermore, the detector module $131_1$ (more specifically the integrator modules INT1, INT2) is reset so that further load changes can be detected. For the correction of drift-related deviations, a drift compensation module DCM can be connected to input terminals of the integrator modules INT1, INT2, which can, for example, prevent the output signals from drifting away under a constant weighing load.

A cumulative summation (CUSUM) of currently present signals as well as recursively determined signals takes place in the integrator modules INT1, INT2. The first integrator module INT1 monitors positive load changes, while the second integrator module INT2 monitors negative load changes.

The foregoing exemplary method allows small changes in the signal, i.e., small load changes, to be determined rapidly and precisely.

As a sensible practice, load-change detection signals from the other filter stages $130_2, \ldots$ should likewise be considered which is why the detector module $131_1$ includes a logic gate OR to which the trigger signals RST, $RST_{IN}$ of the local comparator CMP as well as of the further filter stages $130_2, \ldots$ can be directed. The generator module $132_1$ is therefore controlled by the signal that is present at the output side of the logic gate OR and is further directed to the other filter stages $130_2, \ldots$ The signal $RST_{OUT}$ which is present at the output side of the logic gate OR further controls the switch SW which is indicated symbolically in FIG. 4 and is provided in exemplary embodiments to short out the filter $133_1$, for example, during at least one measurement cycle Ts after a load change has occurred.

The closure function $f_c(t)$ which is used after a load change has been detected is derived, for example, from the transient settling time of the filter which depends on the magnitude of the noise a (see FIG. 7) that can be expected to occur at the input side of the filter and which also depends on the resolution A of the force-measuring device.

A suitable closure function $f_c(t)$ can be found as follows. Based on the amplitude a of the noise and the resolution A of the balance, a factor $\rho$ is determined:

$$\rho = 1/(a \times A)$$

With the measurement cycle time Ts and the elapsed time ti since the load change, the filter parameter r can be selected as follows:

$$r = 1 - e^{[\ln \rho \times (Ts/ti)]}, \text{ or } r = 1 - \rho^{(Ts/ti)}$$

Accordingly, the closure function $f_c(t)$ describing the variation that the filter parameter r is subjected to depends only on the amplitude a of the noise that is present at the input side of the filter $133_1$ and on the desired resolution A. The time profile of the closure function $f_c(t)$ is being followed only to the point where an end value x ($r=x$ $\{0<x \leq 1\}$) has been reached that was calculated for a bandwidth that needs to be maintained. Since the factor $\rho$ is small ($\rho <<1$; $\rho >0$), the logarithm $\ln \rho$ takes on a negative value (for example $-10$) which at the time of the load change determines the value of the exponent $[\ln \rho \times (Ts/ti)]$, because Ts/ti at that time is approximately equal to 1. Consequently, the expression $1-e^{[\ln \rho \times (Ts/ti)]}$ takes on a value that is close to zero, and the value of r will be close to 1, so that as a result the transfer function is approximately equal to 1.

FIG. 5 shows an exemplary digital signal-processing unit 13 with n filter stages $130_1, \ldots, 130_n$ which together form an n-th order filter and which have filter parameters $r_1, \ldots, r_n$ individually assigned to them. The afore-described modules of the filter stages $130_1, \ldots, 130_n$ are realized by means of a software program which is stored in a memory 1301 and executed by a signal processor 1300.

FIG. 6 shows the digital signal-processing unit 13 of FIG. 5 with an optimizing module 135 by means of which the filter parameters $r_1, \ldots, r_n$ or more specifically their end values $r_{1x}, \ldots, r_{nx}$ and closure functions $f_{c1}(t), \ldots, f_{cn}(t)$, can be individually optimized.

Figure 7:
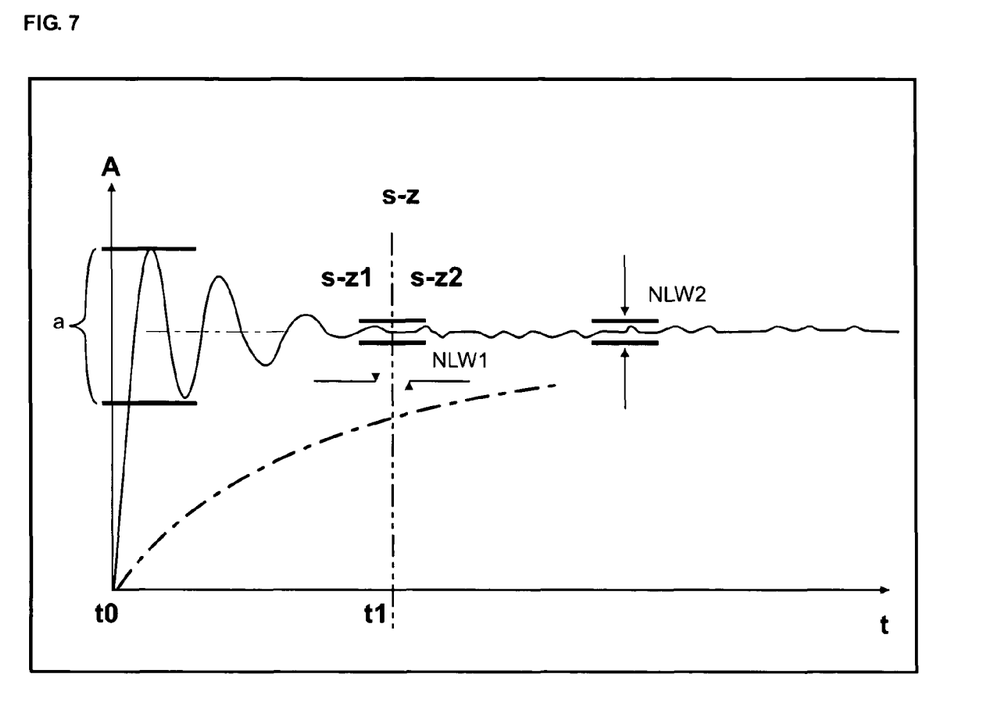
FIG. 7 illustrates an exemplary time profile of the measuring signal after a load change has occurred.

In the following, the optimization module 135 which is implemented by means of a program $P_{OPT}$ will be explained in more detail with reference to the signal profile s-z that is shown in FIG. 7. For the duration of the transient settling period of the measuring system, the closure functions $f_{c1}(t), \ldots, f_{cn}(t)$ are of primary relevance. In the execution of the optimization program POPT, the closure functions $f_{c1}(t), \ldots, f_{cn}(t)$ are therefore during a first optimization phase subjected to a stepwise variation, and the varied closure functions in each step are applied to the stored signal profile s-z, whereupon a test is made to determine the time t1 at which the decaying transient signals lie within the boundaries of a first window NLW1. The test step in which the shortest time t1 is registered therefore indicates that the respective set of signal profiles of the closure functions $f_{c1}(t), \ldots, f_{cn}(t)$ represents an optimum, and these closure functions are subsequently used in the filter stages $130_1, \ldots, 130_n$. The end values $x_1, \ldots, x_n$ of the filter parameters $r_1, \ldots, r_n$ are relevant for the noise level of the measuring signal that is present after the transient settling phase of the measuring system. In a second optimization phase of the optimization program $P_{OPT}$, the end values $x_1, \ldots, x_n$ of the filter parameters $r_1, \ldots, r_n$ are therefore subjected to a stepwise variation, and the varied end values in each step are applied to the stored signal profile s-z, whereupon a test is made to determine which set of end values $x_1, \ldots, x_n$ allows a noise-limiting second window NLW2 to be closed best. The optimization of the balance can be performed on the basis of several signal profiles that were recorded under favorable operating conditions of the balance 1.

The methods and balance 1 have been described and illustrated as various exemplary embodiments. The exemplary force-measuring device has been described in the form of a balance 1. However, exemplary embodiments can also be used in other force-measuring devices such as gravimetric measuring devices, weighing modules, load cells and force sensors which in some cases can form part of a balance.

Further, the described exemplary embodiments can be used in combination with different technologies such as analog technology or digital technology, or can be realized as a software solution in conjunction with a signal processor. It will be appreciated by those skilled in the art that the present invention can be embodied in other specific forms without departing from the spirit or essential characteristics thereof. The presently disclosed embodiments are therefore considered in all respects to be illustrative and not restricted. Furthermore, the invention is of course not limited to the filters presented herein but can be realized with any desired variable filters of any desired order. The scope of the invention is indicated by the appended claims rather than the foregoing description and all changes that come within the meaning and range and equivalence thereof are intended to be embraced therein.

Literature References

[1] "Bauen Sie Ihre Qualität auf solidem Grund!" (*Build your Quality on Solid Ground!*), company publication, Mettler Toledo GmbH, January 2001

[2] "Wägefibel" (*Weighing Primer*), Mettler Toledo GmbH, April 2001EP 0 945 717 A1

[3] CH 673 529 A5

[4] DE 10024986 A1

[5] U.S. Pat. No. 5,665,941

[6] US 2004/0088342 A1

[7] U.S. Pat. No. 6,271,484 B1

[8] U. Tietze, Ch. Schenk, "Halbleiterschaltungstechnik" (*Semiconductor Circuit Design*), $11^{th}$ edition, $1^{st}$ reprint, Springer Verlag, Berlin 1999

What is claimed is:

1. A method of processing the output signal of a measuring transducer in a force-measuring device, wherein the measuring transducer produces a measuring signal representative of a load acting on the device, said measuring signal being filtered in a variable analog filter and/or digital filter, after the signal has been processed in an analog/digital converter, in a variable digital filter, in order to remove unwanted signal components that are caused by disturbances affecting the force-measuring device, by changes in the weighing load, the measuring signal being monitored in regard to occurrence of a change in weighing load and after a load change has been detected, the method comprising:

resetting and varying at least one filter parameter of the analog or digital filter as a function of time in accordance with a prescribed profile $f_c(t)$; and opening the analog and/or digital filter after a load change has been detected and then closing the analog and/or digital filter to a point where a predefined filter characteristic has been attained which is determined by an end value of the at least one filter parameter.

2. The method according to claim 1, wherein the time profile of the function $f_c(t)$ is determined by an exponential function.

3. The method according to claim 1, wherein the digital filter is a recursive or non-recursive n-th order filter which is arranged in a filter stage, an IIR filter or an FIR filter having a detector module individually assigned to it which serves to detect changes in the weighing load, and further having a generator module assigned to it which serves to generate values for the filter parameters that correspond to the profile of the closure function $f_c(t)$.

4. The method according to claim 3, wherein said analog and digital filters have a logarithmic distribution of bandwidths, and wherein the digital filter includes a plurality of discrete filter stages, each of them having a lower-order filter and a first-order filter, which are serially connected in such a way that the measuring signal is processed sequentially in all of the filter stages, and when a change of the weighing load is detected in one of the filter stages, this is communicated to the other filter stages.

5. The method according to claim 3, wherein when a change in the weighing load has been detected, the input- and output terminals of the filter stages which serve for the entry and exit of the measuring signal are connected to each other for at least one measurement period, so that the measuring signal can pass through the filter stages without being processed.

6. The method according to claim 3, wherein the measuring signal or its time derivative in the detector module is directed by way of a delimiter module to a first integrator module and by way of an inverter module to a second integrator module, whereupon resultant output signals at output sides of the integrator modules are compared to a threshold value in a comparator module, and after the threshold value has been exceeded, the generator module and also the detector module are reset; or wherein an interval between zero crossings of the time derivative of the measuring signal is compared to a threshold value in a comparator module, and after the threshold value has been exceeded, the generator module and also the detector module are reset.

7. The method according to claim 3, wherein after a load change has been detected, the filter parameter is reset to a value which causes the transfer function G(z) of the filter to be at least approximately equal to 1, wherein the reset filter parameter is selected to be exponentially variable dependent on the noise that was present at the load change and dependent on the resolution of the force-measuring device.

8. The method according to claim 3, wherein for the optimization of the force-measuring device, the function $f_c(t)$ which determines the variation of the filter parameter and/or the end value of the filter parameter is subjected to stepwise changes and the resultant effects of the changes are determined on the basis of at least one stored signal profile, whereupon for the subsequent signal-processing that profile of the function $f_c(t)$ and that end value of the signal parameter are kept which, respectively, resulted in the shortest oscillation-settling time after a load change and in the lowest noise level after the transient settling phase of the force-measuring device.

9. A force-measuring device, comprising:
at least one processor,
at least one memory storage unit, and
a measuring transducer producing a measuring signal representative of a load acting on the device, wherein said measuring signal can be filtered in a variable analog filter and/or, after having been processed in an analog/digital converter, said measuring signal can be filtered in a variable digital filter, in order to remove unwanted signal components that are caused by disturbances affecting the force-measuring device, by changes in the weighing load, wherein at least one detector module is provided which is operable to monitor the measuring signal and to detect changes in the weighing load, which detector module controls a generator module which is operable to reset at least one filter parameter of the analog and/or digital filter and to vary said filter parameter as a function of time in accordance with a prescribed time profile $f_c(t)$, so that the analog and/or digital filter can be opened after a load change has been detected and then closed again to the point where a predefined filter characteristic has been attained which is determined by an end value of the at least one filter parameter.

10. The force-measuring device according to claim 9, wherein the time profile of the function $f_c(t)$ is determined by an exponential function.

11. The force-measuring device according to claim 9, wherein the digital filter is a recursive or non-recursive n-th order filter which is arranged in a filter stage, an IIR filter or an FIR filter having the detector module and the generator module individually assigned to it.

12. The force-measuring device according to claim 11, wherein said analog and digital filters have a logarithmic distribution of bandwidths, and wherein the digital filter includes a plurality of discrete filter stages, each of them having a low-order filter and a first-order filter, which are serially connected in such a way that the measuring signal can be processed sequentially in all of the filter stages, and when a change of the weighing load is detected in one of the filter stages, this can be communicated at least to the subsequent filter stages in the series.

13. The force-measuring device according to claim 11, wherein the measuring signal or its time derivative in the detector module can be directed by way of a delimiter module to a first integrator module and by way of an inverter module to a second integrator module, whereupon resultant output signals at output sides of the integrator modules can be compared to a threshold value in a comparator module, and after the threshold value has been exceeded, the generator module and the detector module can be reset; or wherein an interval between zero crossings of the time derivative of the measuring signal can be compared to a threshold value in a comparator module, and after the threshold value has been exceeded, the generator module and also the detector module can be reset.

14. The force-measuring device according to claim 9, wherein after a load change has been detected, the filter parameter is reset to a value which causes the transfer function G(z) of the filter to be at least approximately equal to 1, and/or wherein the reset filter parameter is selected to be exponentially variable dependent on the noise that was present at the load change and dependent on the resolution of the force-measuring device.

15. The force-measuring device according to claim 9, wherein a program is provided which serves to optimize the force-measuring device and by means of which the function $f_c(t)$ that determines the variation of the filter parameter and/or the end value of the filter parameter can be subjected to stepwise changes and the resultant effects of the changes can be determined on the basis of at least one stored signal profile, whereupon that profile of the function $f_c(t)$ and that end value of the signal parameter are kept for the subsequent signal-processing which, respectively, resulted in the shortest oscillation-settling time after a load change and in the lowest noise level after the transient settling phase of the force-measuring device.

16. The force-measuring device according to claim 12, wherein the discrete filter stages include at least one of recursive and non-recursive filters.

17. The force-measuring device according to claim 12, wherein the discrete filter stages form a filter cascade with recursive filters that are followed in series by at least one non-recursive filter.

18. The force-measuring device according to claim 9, wherein at least one additional non-variable analog or digital filter is provided for filtering of the measuring signal.

19. The force-measuring device according to claim 1, in combination with a measuring balance.

* * * * *